March 4, 1969     V. C. J. PETERSON     3,430,897
ENERGY ABSORBING SYSTEM
Original Filed Dec. 23, 1965     Sheet 1 of 3
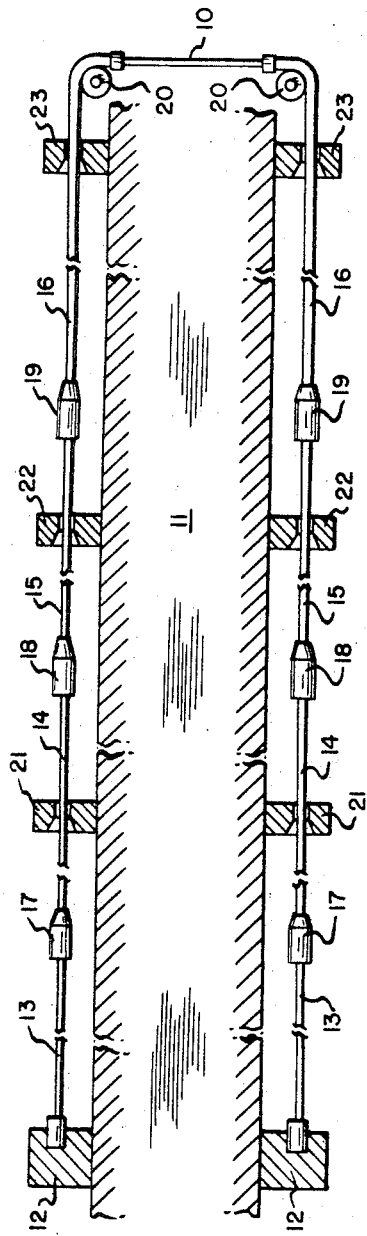
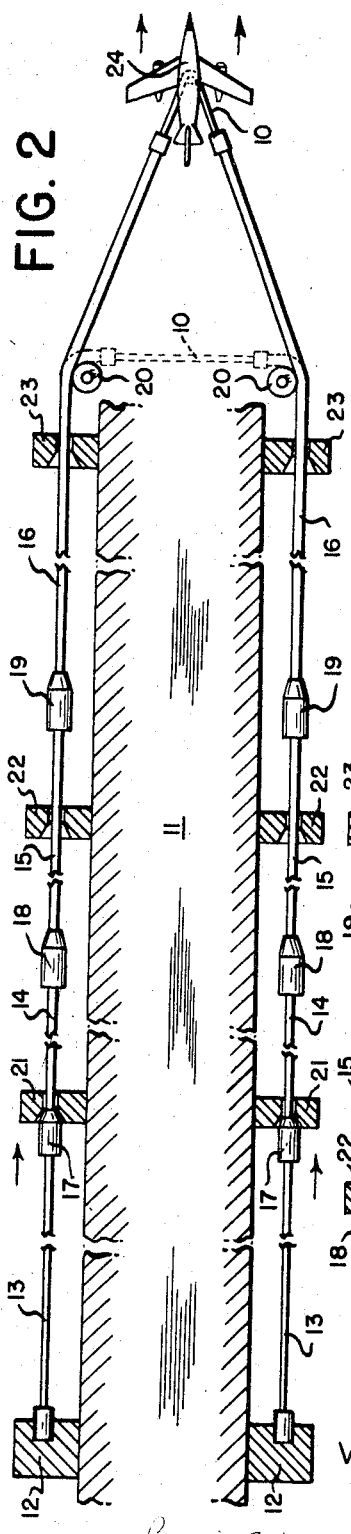
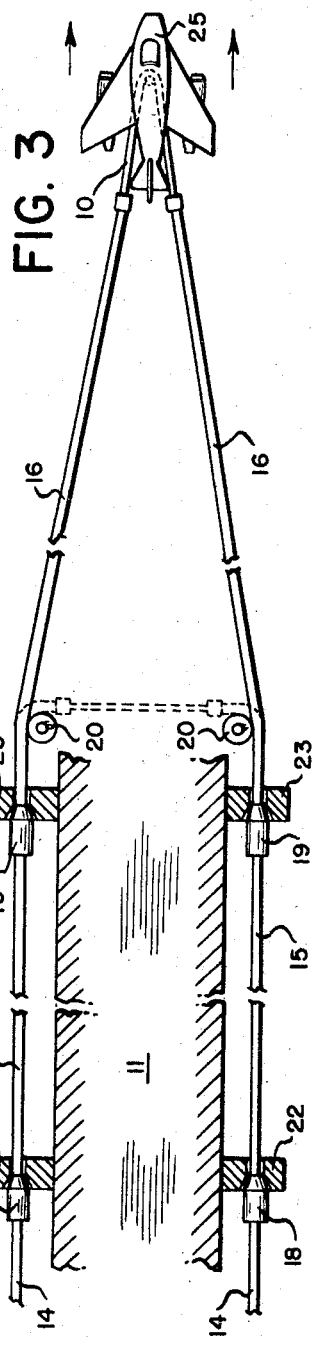
INVENTOR
Vincent C.J. Peterson
BY
ATTORNEYS

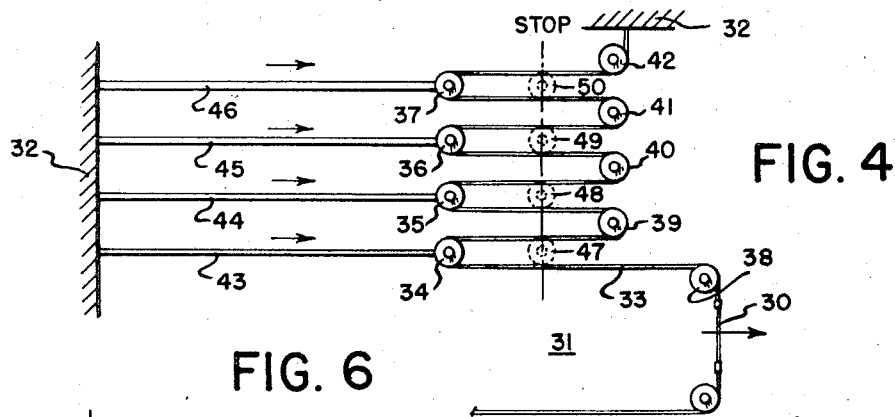
FIG. 4
FIG. 6
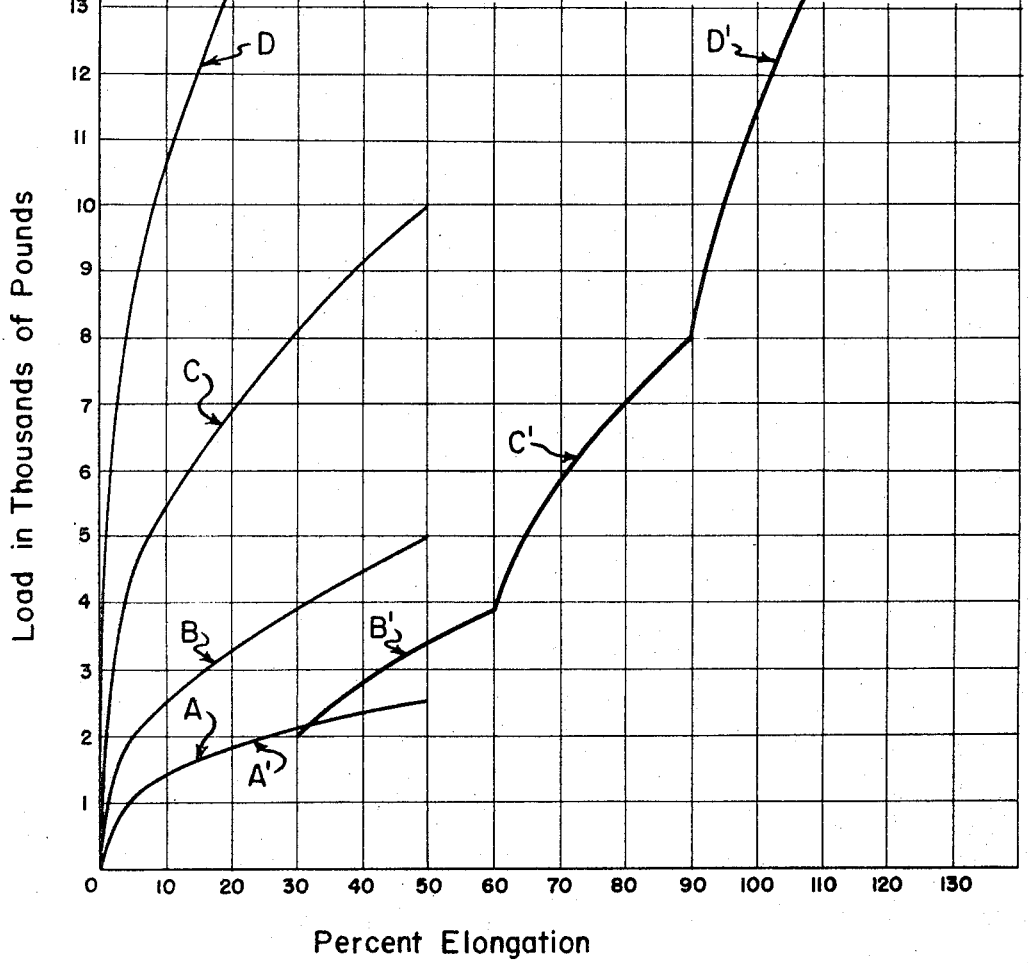
INVENTOR
Vincent C.J. Peterson
BY
ATTORNEYS

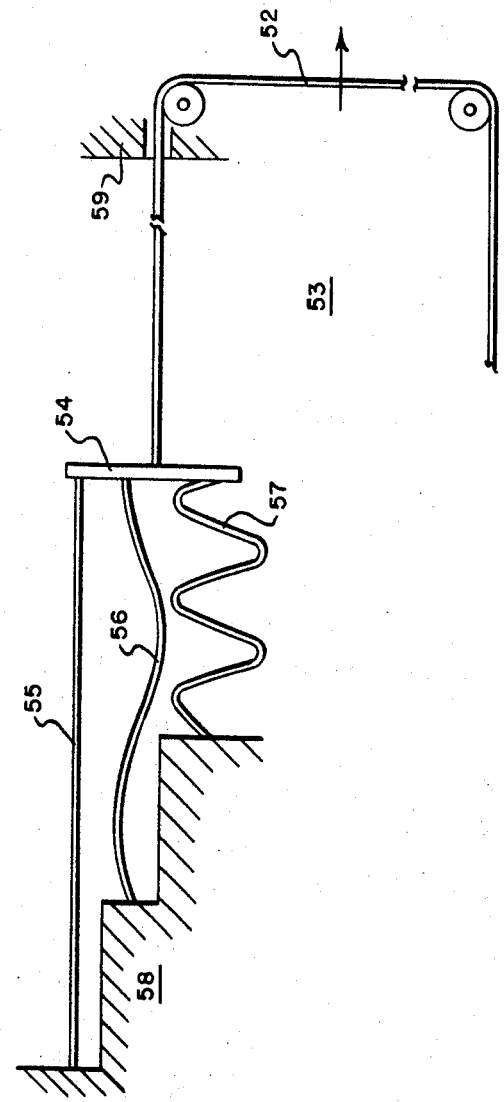

United States Patent Office 3,430,897
Patented Mar. 4, 1969

3,430,897
ENERGY ABSORBING SYSTEM
Vincent C. J. Peterson, Huntingdon Valley, Pa., assignor to American Chain & Cable Company, Inc., New York, N.Y., a corporation of New York
Original application Dec. 23, 1965, Ser. No. 515,979, now Patent No. 3,353,768, dated Nov. 21, 1967. Divided and this application July 24, 1967, Ser. No. 671,513
U.S. Cl. 244—110                                  1 Claim
Int. Cl. B64c 25/68, 25/58

ABSTRACT OF THE DISCLOSURE

A kinetic energy absorbing device connecting a load receiving pendant with an anchorage point, the device comprising a plurality of cables arranged in parallel with slack being present in the respective cables in varying amounts in the initial position of the load receiving means so that the cables are placed under tension sequentially during application of the load.

---

This invention relates to devices for absorbing kinetic energy, and more particularly to a device which includes extensible cables for absorbing increasing amounts of energy in stages. This application is a division of Ser. No. 515,979, filed Dec. 23, 1965.

Though this new energy absorbing device has a wide variety of uses, it is particularly well suited to aircraft arresting equipment. In order that an energy absorbing system be capable of arresting aircraft of a wide range of weight and speed, it is necessary that a system designed to arrest the faster and heavier aircraft shall not offer too much resistance to the lighter aircraft. Otherwise, the great resistance encountered may result in too rapid deceleration of the aircraft, which is unsafe for passengers, or in extreme cases the breaking or pulling off of the aircraft arresting hook. Certain energy absorbing systems in the past have attempted to meet these demands by offering varying resistance to the vehicle in motion as that vehicle is being arrested, but invariably these systems utilize complicated independent means for absorbing energy in a sequential manner. It is the purpose of this invention to provide arresting means wherein a simple system of extensible cables is used to absorb energy sequentially, thereby reducing greatly the degree of complication of the apparatus and insuring that it can satisfactorily arrest the motion of objects of widely varying mass.

Broadly stated, the invention provides an improved energy absorbing device interconnecting anchorage means and load receiving means displaceable from an initial position with respect thereto in apparatus for absorbing kinetic energy. Two or more extensible cables are cojoined with one another and the load receiving and anchorage means and they are adapted to be elongated during application of the load and displacement of the load receiving means. Sequentially operable means are provided for controlling the relative elongation of the cables so that increasingly more load is required to displace the load receiving means from its initial position through subsequent positions corresponding in number to the number of the cables.

In one general form of the invention, the cables are adapted to be placed simultaneously in tension upon application of the load and are capable of differing amounts of elongation under a given tensile force. The sequentially operable means in that case comprises stop means which prevents the more easily extensible cable or cables from elongating beyond the breaking point without interfering with the elongation of the less easily extensible cable or cables. In another form of the invention the cables are arranged in parallel between the load receiving and anchorage means, the sequentially operable means being slack which is present in the respective cables in varying amounts in the initial position of the load receiving means so that the cables are placed in tension sequentially during application of the load and displacement of the load receiving means.

By arranging various cables in this fashion, aircraft or other objects of varying size and weight can be arrested without exceeding critical limits of deceleration. The components of the new system possess a marked degree of simplicity of both with respect to their construction and operation so that capital and maintenance costs can be kept to a minimum. These and other advantages of the invention will be apparent from the following detailed description of preferred embodiments, wherein:

FIG. 1 is a schematic plan view of one embodiment of the new arresting device employed as an aircraft arresting device;

FIG. 2 is a similar view of a relatively light plane being arrested by that arresting device;

FIG. 3 is a similar view of a relatively heavy plane being arrested by that arresting device;

FIG. 4 is a similar view of another embodiment of the invention;

FIG. 5 is a similar view of a third embodiment of the invention; and

FIG. 6 is a stress-strain curve characteristic of a particular embodiment of the invention.

In FIG. 1, a pendant 10 extends in its initial position across a runway 11 on which an aircraft is to be arrested. The pendant 10 or load receiving means is adapted to be picked up by and secured to the aircraft to be arrested. A pair of anchorage blocks 12 are placed on each side of the runway 11 and are spaced from the pendant 10 in the direction from which the aircraft approaches the pendant 10. A series of annealed stranded wire extensible cables 13, 14, 15 and 16 joined end to end interconnects each anchorage block 12 with one end of the pendant 10. Each series of cables 13, 14, 15 and 16 extends substantially linearly along its respective side of the runway 11 and the two series are parallel to one another. The cables 13, 14, 15 and 16 are spliced end-to-end by fittings 17, 18 and 19. Each cable 13, 14, 15 and 16 is capable of elongating under load, but the physical properties of the cables 13, 14, 15 and 16 are such that cable 14 elongates to a lesser extent under a given tensile force than the cable 13, the cable 15 elongates to a lesser extent under a given tensile force than the cable 14, and the cable 16 elongates to a lesser extent under a given tensile force than the cable 15. This may be done, for example, by using the same material for each cable, but with each cable having a diameter less than its neighboring cable secured closer to the pendant 10.

Thus, when the series of cables 13, 14, 15 and 16 is placed under a load of a given amount, each cable will elongate, but the cable 13 will elongate to a greater extent than the cable 14, the cable 14 will elongate to a greater extent than the cable 15, and the cable 15 will elongate to a greater extent than the cable 16. Each cable 16 is disposed about a sheave 20 placed on each side of the runway 11 adjacent the pendant 10. Surrounding each of cables 14, 15 and 16 loosely are fixed annuluses 21, 22 and 23. The annuluses 21, 22 and 23 are configured to prevent movement of the fittings 17, 18 and 19 respectively therethrough, and are so placed prior to the arresting of an aircraft that the annulus 21 is spaced along the cable 14 from the fitting 17 a distance less than the ultimate extensibility of the cable 13, the annulus 22 is spaced along the cable 15 from the fitting 18 a distance less than the sum of the limits of elongation of the cables 13 and 14, and the annulus 23 is spaced along the cable 16 from the fitting 19 a distance less than the sum of the limits of elongation of the cables 13, 14 and 15. The annuluses 21, 22 and 23 thus serve to stop the elongation of the cables 13, 14 and 15 within the respective limits of their ultimate extensibility. With the respective fittings they serve as sequentially operable means for controlling the relative elongation of the cables so that increasingly more load is required to displace the pendant through four stages.

FIG. 2 shows the arresting system in operation. A relatively light aircraft 24 has engaged the pendant 10, placing cables 13, 14, 15 and 16 in tension. As explained above, all of the cables will elongate to an extent, but the cables 13, the most easily extensible cable, elongate the greatest amount. These cables 13 have elongated until the fittings 17 have contacted the annuluses 21 and some elongation of cables 14, 15 and 16 has taken place before stopping the aircraft 24. Since the most easily extensible cables elongate to their limits first, the kinetic energy of the relatively light aircraft is absorbed gradually, and the deceleration of the aircraft is not dangerously high.

In FIG. 3, a relatively heavy aircraft 25 has engaged the pendant, placing the cables 13, 14, 15 and 16 in tension. As pointed out above, all of the cables 13, 14, 15 and 16 elongate to some extent under any given tensile force, but cables 13 which are the most easily extensible stretch the greatest mount. These cables 13 have elongated slowing the aircraft, until the fittings 17 have contacted the annuluses 21 (not shown) thereby ending the elongation of those cables 13. Since the cables 13 could not be elongated further, cables 14 have elongated slowing the plane even more, until fittings 18 have contacted the annuluses 22, thereby ending the elongation of those cables 14. Since the cables 14 could not be elongated further, the cables 15 have elongated slowing the aircraft even more, until the fittings 19 have contacted the annuluses 23, thereby ending the elongation of cables 15. Since the cables 13, 14 and 15 have been stretched to their limits only the cables 16, the least easily extensible cables, have elongated further and the plane was finally stopped.

In the embodiment shown in FIG. 4, a pendant 30 extends across a runway 31 and is adapted to be picked up by and secured to a moving aircraft. While both ends of the pedant 30 could be connected to energy absorbing means, such means are shown on one end only where the pendant 30 is secured to anchorage means 32 by a transmission line or cable 33. Translatable sheaves 34, 35, 36 and 37 and non-translatable sheaves 38, 39, 40, 41 and 42 are placed adjacent the end of the pendant 30, and connecting the respective translatable sheaves 34, 35, 36 and 37 to the anchorage means 32 are annealed stranded wire extensible cables 43, 44, 45 and 46, each cable being capable of a certain elongation under a given tensile load different from that of the other extensible cables. The transmission cable 33 passes in runs alternately over the translatable and non-translatable sheaves so that the extensible cables 43, 44, 45 and 46 are placed simultaneously in tension when load is applied. Stops 47, 48, 49 and 50 are placed along the path of travel of the translatable sheaves 34, 35, 36 and 37 respectively to prevent movement of those sheaves past a certain point, and thereby to prevent the elongation of any particular cable beyond the limit of its ultimate extensibility. Each stop 47, 48, 49 and 50 is also arranged so that it will not interfere with the elongation of the other cables.

The operation of this system is quite similar to that of the FIG. 2 and FIG. 3 system. When a load is applied to the transmission cable 33 (as during the arresting of a plane), each cable 43, 44, 45 and 46 is subject to a load of twice that in the transmission cable 33. Thus, when a relatively light aircraft engages the pendant 30, the most easily extensible cables will extend the greatest amount, absorbing energy gradually and insuring that the aircraft will not be decelerated too rapidly. And when a relatively heavy aircraft is to be arrested, the less easily extensible cables will come more into effect as energy is absorbed to insure that the heavier aircraft is properly arrested.

A third embodiment of the invention is shown in FIG. 5 and here again a pendant 52 extends across a runway 53 to arrest a moving aircraft. As in the previous embodiment, the energy absorbing device could be duplicated and disposed on either side of the runway but it is illustrated here only on one side. It includes a suitable abutment in the form of yoke 54 from which extensible cables 55, 56 and 57 of annealed stranded wire extend in parallel arrangement to anchorage means 58. In the initial position of the load receiving means or pendant 52 as shown in FIG. 5, there is no slack in the cable 55, there is some slack in the cable 56, and still more in the cable 57. The anchorage means 58 may be offset so that all three cables may be of equal length and provided with slack in varying amounts, but this is not necessary.

When the load is applied to the form of the device shown in FIG. 5, the cable 55 elongates first until the slack in the cable 56 is taken up, and then they elongate together. Thereafter the cables 55 and 56 elongate simultaneously until the slack in the cable 57 is taken up and all three begin to elongate together. Stop means 59 may be provided in the path of travel of the yoke 54 to terminate the elongation of all the cables before the load receiving means extends the first-tensioned cable 55 beyond its breaking point. If desired the cables 55, 56 and 57 may be capable of varying elongation under a given tensile force so that the amount of energy absorption from one stage to the next changes, but in many instances it will suffice to have all the cables equal in this respect. Even when all the cables are equally extensible under a given tensile force, increasingly more load is required to move the pendant from one stage to the next because the retarding effect of the cables is cumulative.

In FIG. 6, stress-strain curves A, B, C and D indicate the performance of the respective fully annealed stranded wire cables 13, 14, 15 and 16 of FIGS. 1, 2 and 3, for example. When those cables are arranged as described and each is allowed to extend to a point within its limit of extensibility, the stress-strain characteristics are those indicated by the curve A, $B^1$, $C^1$, $D^1$. The annealing of the cables results in an extraordinary improvement in the percentage of elongation of stranded wires of the metal cables, which results in more even deceleration of the arrested object and very little "bounce-back."

It is thus clear that both relatively light and relatively heavy airplanes can be arrested satisfactorily by the same energy absorbing system, and that the kinetic energy is absorbed by a simple system of cables.

I claim:

1. In an apparatus for absorbing kinetic energy including anchorage means and load receiving means displaceable from an initial position with respect thereto, an improved energy absorbing device interconnecting the load receiving and anchorage means comprising:

(a) two or more extensible cables each of which is fixed at one end to said anchorage means and connected at its other end to said load receiving means, said cables being arranged in parallel between said load receiving means and anchorage means with varying amounts of slack in the respective cables when the load receiving means is in said initial position so that the cables are placed in tension sequentially during application of the load and displacement of the load receiving means;
(b) abutment means connected to the other end of each of said cables for movement with said cables during tensioning thereof; and
(c) fixed stop means positioned in the path of movement of said abutment means for terminating the elongation of all of said cables before the load receiving means extends said cables beyond their breaking points.

References Cited

UNITED STATES PATENTS 3,191,890 6/1965 Adams _____ 244—110

FOREIGN PATENTS 1,230,584 4/1960 France.
182,117 1/1963 Sweden.

MILTON BUCHLER, *Primary Examiner.*

P. E. SAUBERER, *Assistant Examiner.*